UNITED STATES PATENT OFFICE.

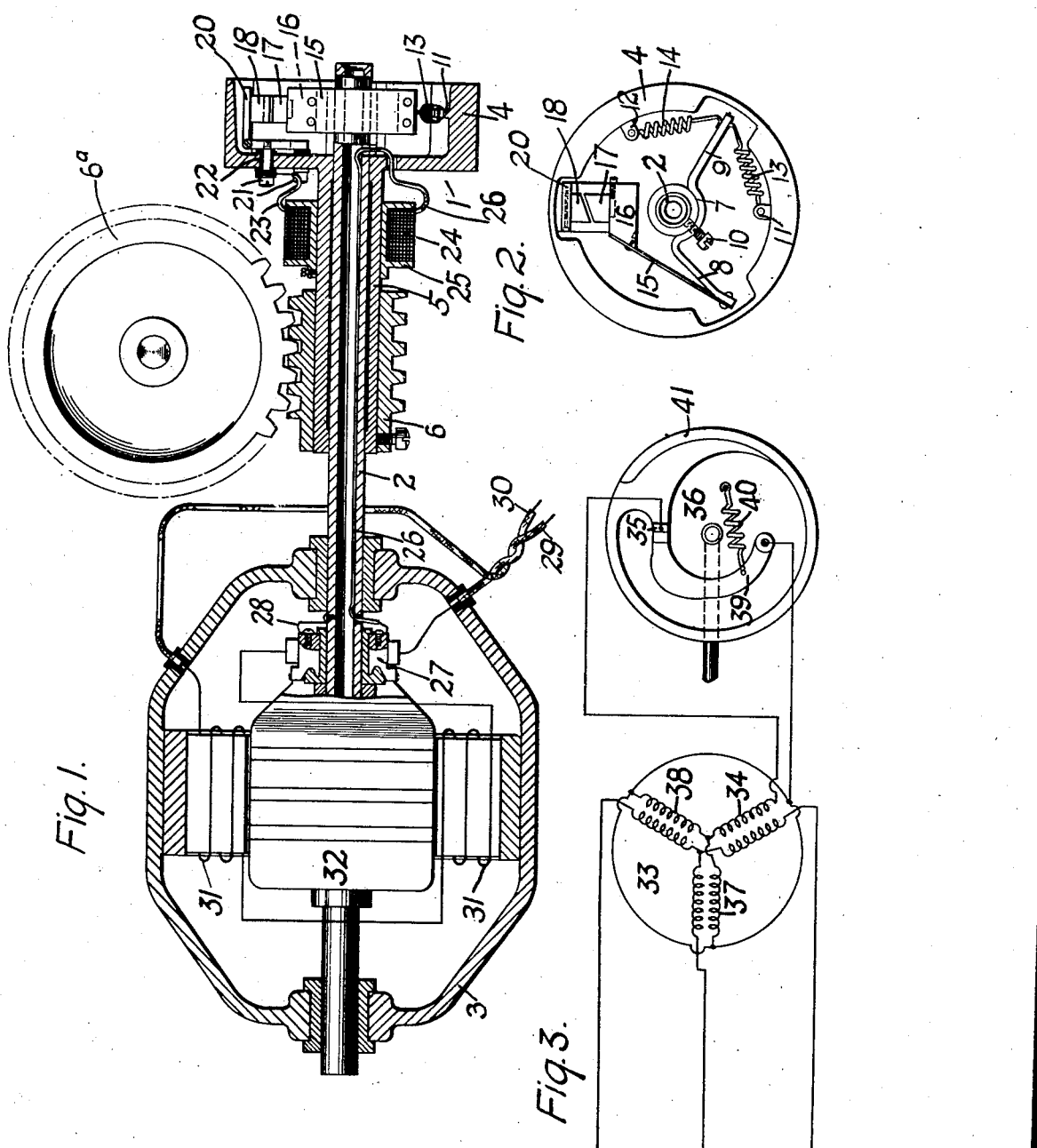

HUGH J. McMAHAN, OF MONESSEN, PENNSYLVANIA.

SPEED-GOVERNOR FOR ELECTRIC MOTORS.

1,190,243.  Specification of Letters Patent.  Patented July 4, 1916.

Application filed December 5, 1911. Serial No. 664,055.

*To all whom it may concern:*

Be it known that I, HUGH J. MCMAHAN, a citizen of the United States, and a resident of Monessen, in the county of Westmoreland and State of Pennsylvania, have invented a new and useful Improvement in Speed-Governors for Electric Motors, of which the following is a specification.

My invention relates to electrical apparatus and particularly to means for controlling the speed of electric motors.

The object of my invention is to provide a simple, compact and reliable means for governing the operation of an electric motor that shall serve to maintain an exact and even speed of rotation.

In order to effect the desired result, I provide means for automatically reducing the torque of the governed electric motor at the instant that its speed attains the desired maximum limit and means for automatically restoring the full torque of the motor at the instant that the speed falls below a certain minimum. I provide, also, means between the shaft of the motor and the gear member which transmits the power of the motor for maintaining a constant and uniform speed of such gear member.

In the accompanying drawing, Figure 1 is a longitudinal sectional view of a motor and a governor device mounted on its shaft in accordance with my invention, and Fig. 2 is an end view of the governor device shown in Fig. 1. Fig. 3 is a diagrammatic view of an alternating current induction motor equipped with a speed governing device of modified construction.

Referring to Figs. 1 and 2, the governor 1 comprises a number of coöperating elements which may be variously modified as to form, number and relative location, and which may be mounted in a variety of ways, but, as here shown, the operating parts are mounted directly upon the shaft 2 of a motor 3 and within the rim of a fly-wheel 4. The motor shaft 2 is made hollow, for convenience, and the fly-wheel is made to fit loosely upon it, except that it is stayed from longitudinal movement by any suitable means. The hub 5 of the fly-wheel is made of sufficient length to afford space upon which to mount a worm 6 that meshes with a worm wheel 6ª the shaft of which supports or is geared to the tool or machine member that constitutes the load for the motor.

The fly-wheel 4 is made of cup shape to receive the principal operating parts of the governor, and the shaft 2 projects through it to receive and support the governor parts that move relatively to it. An arc-shaped member 7 having two arms 8 and 9 that project substantially at right angles to each other, is clamped to the shaft 2, within the fly-wheel, by a set screw 10. The outer end of the arm 9 is connected to projections 11 and 12 on the rim of the fly-wheel by springs 13 and 14, the functions of which will be hereinafter more fully set forth. One end of a preferably resilient bar or strip 15 is riveted to the free end of the arm 8 and its other end is provided with a weight 16. Mounted upon the weight 16 is a contact piece 17, preferably made of nickel or silver. A similar contact piece 18 is mounted, in suitable coöperative relation to the piece 17, upon a holder 20 which is fastened to, but is insulated from, the fly-wheel by means of screws 21 and insulated bushings 22. The contact members 17 and 18 preferably oppose each other in a plane oblique to the associated radius of the fly-wheel 4 for a purpose to be hereinafter pointed out. To one of the screws 21 is connected an insulated wire 23, which constitutes one terminal of a resistor, here shown as a coil 24 of resistance wire, the spool 25 upon which it is wound being mounted upon the hub of the fly-wheel, though the resistor may be of any other suitable material and be mounted upon the rim of the fly-wheel or within it, or elsewhere, as may be desired. A wire 26 connects the other terminal of the resistor to one of the bars or segments of the commutator cylinder 27 of the motor 3, and a bar or segment of different potential, here shown as the opposite bar or segment, is connected to the shaft 2 by means of a wire 28, though connection may be made between the segment and the contact piece 17 otherwise than by means of the shaft, if desired. The motor is supplied with current in the usual way through wires 29 and 30, the field magnet winding 31 being preferably connected in series with the winding of the armature 32.

For convenience in describing the operation of the several elements and their functions in controlling the motor speed, let it be assumed that the motor is started in such direction that the shaft 2 turns the arm 9 against the tension of the spring 13, and, on account of the yielding of the spring, the fly-wheel is caused to rotate at a slight lag with relation to the shaft. The said lag is in proportion to the stiffness of the spring 13 as compared with the torque of the motor and the load, and the greater the torque of the motor, the nearer the face of the contact member 17 approaches the face of the contact member 18.

When the speed of rotation of the shaft 2 reaches a predetermined rate, the centrifugal force acting upon the weight 16 deflects the spring 15 in an outward direction sufficiently to cause the contact pieces 17 and 18 to engage and close the circuit through the resistor 24 and allow current to flow from the commutator bar to which the wire 28 is fastened, through the said wire, the shaft 2, the arm 8, the spring 15, the weight 16, the contact pieces 17 and 18, the insulated holder 20, the screw 21, the wire 23, the resistance wire 24, the wire 26, and the commutator bar to which the wire 26 is attached. The current that flows in this circuit is generated in the armature of the motor and, when the said circuit is closed, it has the effect of imposing an additional load which acts substantially the same as a mechanical brake. The energy that is consumed in the braking action of this resistance circuit is dissipated in the form of heat which is radiated from the surface of the resistance wire, the energy consumed being in proportion to the heat that is developed in the resistance wire and dissipated by radiation and convection.

The current that flows in the described circuit is an alternating current, even though the motor is being driven by a direct current, and this fact is of advantage in that an alternating current does not tend to maintain an arc between metal terminals as readily as a direct current. The nickel contact pieces 17 and 18 will, therefore, not be materially injured by sparking when making and breaking the circuit, as before described.

It will be seen that the speed of the motor is controlled by imposing an electric load on the armature when the speed exceeds a desired maximum, and by withdrawing such load when the speed falls below a desired minimum. In a reverse manner, the operation of the governor is as follows: when the before described electrical load has had the effect of slightly reducing the speed of the armature shaft, the spring 15 re-acts, as the centrifugal force is lessened, and, at the same time, the pull on the spring 13 is reduced a proportionate amount, thus permitting it to contract and, in so doing, it reduces the lag of the fly-wheel with reference to the shaft, the two last described actions coöperating to cause a separation of the contacts 17 and 18 because of said aforementioned obliquity of contact. Consequently, the braking circuit opens in a manner that does not substantially alter the speed of the fly-wheel, thereby permitting the armature to again accelerate until the increase in the centrifugal force on the weight 16 and also the increase in the lag of the fly-wheel, acting in conjunction, serve to again close the braking circuit and check the acceleration. It will be evident, therefore, that the speed of rotation of the armature will be continually varying between a certain maximum and a certain minimum, so arranged by the relation of the elements to be as slight as is practicable. The spring 13 which is interposed between the shaft 2 and the fly-wheel 4 also serves the additional purpose of forming a flexible connection between the shaft and the fly-wheel and substantially compensating for the difference between the aforesaid maximum and minimum speeds of the motor shaft, while the fly-wheel maintains a mean speed between the two. The elements are so arranged, proportioned and adjusted that the said maximum and minimum speeds of the motor recur at very short intervals and in rapid and rhythmical succession, so that the impulses delivered to the fly-wheel are cycle-like in character, but the impulse cycles are of sufficiently rapid recurrence and of sufficiently low variation in intensity as not to disturb the momentum of the fly-wheel. In fact, the adjustment and proportion of the parts can be such that the said cycles are of unnecessary frequency and, in such cases, it is practicable to either supplement or replace the spring 13 by a more slowly acting means, in order that the governing action may be as required. Not only does the obliquity of contact of the members 17 and 18 aid in opening and closing the circuit through coaction with the spring 13, but it also serves to render the frequency of braking action more or less independent of the load on the motor in the following manner: Assume that it is desired to operate the motor at 1000 revolutions per minute, that the point of application of the braking device is 1025 revolutions per minute and that the point of release thereof is 975 revolutions per minute. If now a relatively light load be imposed upon the motor, wherewith the tendency would be to run up, on the well known series motor characteristic, to a speed of, for example, 1800 revolutions per minute, there is a strong accelerating force tending to raise the speed from the point of brake release, 975 revolutions per minute, to the point of brake application, 1025 revolutions per minute. The resultant tendency is to produce an undesirably high frequency of application of the braking apparatus. With said light load, however, the spring 13 is but little distended and therefore the contact members 17 and 18 are widely separated, demanding an appreciable period of time for the development of sufficient centrifugal force to move the member 17 into contact with the member 18 and hence counteracting said tendency to too frequent an application of the braking apparatus. Conversely, with a heavy load, with which the inherent speed would be, for example, 1200 revolutions per minute, there is a very slow acceleration from 975 to 1025 revolutions per minute and the frequency of application of the braking apparatus would tend to be too low. Under these conditions, however, the spring 13 is considerably distended and the possible range of movement of the member 17 before making contact with the member 18 is comparatively small. It follows, therefore, as a result of the specific structure employed, that the frequency of application of the braking apparatus is more or less independent of the load on the motor and hence may be maintained within desirable limits for the most successful operation.

I have already suggested that the essential elements of my invention are susceptible of embodiment in a structure that may vary widely from that specifically illustrated, as regards form, number and relation of parts, and I desire it to be also understood that the invention may be utilized for governing the speed of any direct or alternating current motor that is suitable for driving its load, whatever may be the nature of such load.

In Fig. 3, I have shown my invention as applied to an alternating current induction motor 33, one section 34 of the secondary winding of which is connected to one contact terminal 35 of a centrifugally operated switch 36, the corresponding terminals of the other sections 37 and 38 of said secondary winding being connected together and to the centrifugally operated member 39 of the switch 36 that is yieldingly restrained against movement by a spring 40. The switch 36 is mounted upon a disk or flywheel 41 that is carried by or is suitably coupled to the motor shaft, so that, at a speed equal to or less than normal, the switch will be closed and the winding sections 34, 37 and 38 be included in a closed circuit. When the speed of the motor exceeds a predetermined value, the switch member 39 will be moved by centrifugal force to separate the contact terminals and thus remove the section 34 from the secondary circuit of the motor, and, upon a reduction in speed, the said section will be promptly restored to the circuit.

While I have indicated a three-phase motor in Fig. 3, it will be understood that a motor which is adapted for operation by one, two or any other number of phases of current may be employed, and that the details may be otherwise varied from what I have shown.

I claim as my invention:

1. A speed governor for an electric motor comprising a speed-adjusted circuit-making and breaking switch and an electrical load that is imposed upon the motor armature when said switch is closed and is withdrawn when said switch is opened, and means for rendering the frequency of application of said breaking load substantially independent of the motor load.

2. A speed governor for an electric motor comprising an electrical load for the motor armature and a circuit-making and breaking switch for inserting and withdrawing said load, one of the members of which turns with the motor shaft and the other has a yielding, lost-motion connection thereto.

3. A speed governor for an electric motor comprising an electrical load for the motor armature and a circuit-making and breaking switch for inserting and withdrawing said load, one of the members of which turns with the motor shaft and the other of which has a resilient lost-motion connection thereto.

4. A speed governor for an electric motor of the commutator type comprising a resistor, a centrifugally operated switch for making and breaking a circuit connection between said resistor and commutator bars of opposite polarity, and means for rendering the frequency of connection of said resistor substantially independent of the motor load.

5. The combination with a commutator type series motor, of a resistor having one terminal connected to one of the commutator bars, a centrifugally operated switch for making and breaking circuit connection between the other resistor terminal and another commutator bar, and means for varying the travel of said switch from the open to the closed position in accordance with the motor load.

6. The combination with a series electric motor and a fly-wheel loosely mounted on the motor shaft, of a resistor rotatable with the fly-wheel and having one terminal connected to one of the commutator segments of the motor, a switch, one of the contact members of which is mounted on the fly-wheel and is connected to the other resistor terminal and the other contact member of which is spring-supported by the motor shaft and is electrically connected to a commutator segment, and a yielding means interposed between the shaft and the fly-wheel.

7. The combination with a series motor, and a fly-wheel loosely mounted upon the motor shaft and yieldingly connected thereto, of a resistor and a switch member mounted upon said fly-wheel and electrically connected together, and a switch member resiliently supported upon said shaft to be moved by centrifugal force into contact with the other switch member and electrically connected to a commutator segment of the motor, the resistor having one terminal connected to another commutator segment.

8. The combination with an electric motor having a commutator, of a resistor, a centrifugally operated switch for making and breaking a circuit between commutator segments of different potential and through said resistor, and means for varying the travel of said switch from the open to the closed position in accordance with the motor load.

9. The combination with a series electric motor, of a resistor, means for connecting its terminals to segments of the motor commutator of opposite polarity and disconnecting the same as the speed of the motor becomes greater or less than normal, and means for rendering the frequency of connection of said resistor substantially independent of the motor load.

10. The combination with a series electric motor, a fly-wheel and a resistor mounted on the fly-wheel, of a switch having a centrifugally operated member and serving to connect the resistor between segments of the motor commutator of opposite polarity and to disconnect the same therefrom as the speed of the motor exceeds or falls below normal.

11. The combination with an electric motor having a commutator, of a resistor, a speed governed switch for making and breaking a circuit between commutator segments of different potential and through said resistor, and means for rendering the frequency of operation of said switch substantially independent of the motor load.

12. The combination with an electric motor, of a resistor, a motor-speed governed switch for making and breaking a circuit that includes said resistor and commutator segments of different potential, and means for varying the travel of said switch between open and closed positions in accordance with the motor load.

13. The combination with an electric motor, of speed-controlling apparatus therefor comprising means for imposing a braking load thereupon when the speed attains a predetermined upper limit and for removing said braking load when the speed attains a predetermined lower limit, and means for rendering the frequency of application of said braking load substantially constant.

14. The combination with an electric motor, of speed-controlling apparatus therefor comprising means for imposing a braking load thereupon when the speed attains a predetermined upper limit and for removing said braking load when the speed attains a predetermined lower limit, and means for compensating for the effect of different motor loads in altering the frequency of application of said braking load.

In testimony whereof, I have hereunto subscribed my name this 22nd day of November, 1911.

HUGH J. McMAHAN.

Witnesses:
C. H. Dils,
Alex Eicher.